US012565858B2

(12) United States Patent
Barone et al.

(10) Patent No.: US 12,565,858 B2
(45) Date of Patent: Mar. 3, 2026

(54) EXHAUST-DRIVEN AUXILIARY TURBINE

(71) Applicant: THE BOEING COMPANY, Arlington, VA (US)

(72) Inventors: Dominic Barone, Centerville, OH (US); Alexander William Feldstein, Natick, MA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/652,503

(22) Filed: May 1, 2024

(65) Prior Publication Data

US 2025/0341185 A1     Nov. 6, 2025

(51) Int. Cl.
   *F02C 7/32*       (2006.01)
   *F02C 7/04*       (2006.01)
   *F02C 7/36*       (2006.01)

(52) U.S. Cl.
   CPC .................. *F02C 7/32* (2013.01); *F02C 7/04* (2013.01); *F02C 7/36* (2013.01); *F05D 2220/76* (2013.01)

(58) Field of Classification Search
   CPC ...... F02C 7/04; F02C 7/32; F02C 7/36; F02C 6/12; F05D 2220/76; F02B 37/00; F02B 37/22; F02B 37/225; F02B 39/10; B64D 27/10; B64D 27/16
   See application file for complete search history.

(56) References Cited

U.S. PATENT DOCUMENTS

| | | | | |
|---|---|---|---|---|
| 4,193,262 A | * | 3/1980 | Snell ....................... | F02K 3/075 60/761 |
| 6,637,205 B1 | * | 10/2003 | Ahmad ................... | F02D 23/00 60/611 |
| 7,107,756 B2 | * | 9/2006 | Rolt ......................... | F02K 3/12 60/225 |
| 8,966,911 B2 | | 3/2015 | Ress, Jr. et al. | |
| 10,502,132 B2 | | 12/2019 | Guijarro Valencia et al. | |
| 2009/0067988 A1 | * | 3/2009 | S. Eluripati ............ | B01F 23/10 415/144 |
| 2014/0250898 A1 | * | 9/2014 | Mackin ................... | F02C 7/047 60/785 |

* cited by examiner

*Primary Examiner* — Loren C Edwards

(74) *Attorney, Agent, or Firm* — Moore IP Law

(57) ABSTRACT

A system includes an engine configured to generate an exhaust stream. The engine includes one or more first shafts rotated by operation of the engine. The system includes an exhaust-driven auxiliary turbine positioned to utilize the exhaust stream to cause rotation of a second shaft other than one of the one or more first shafts. The system also includes a device coupled to the second shaft. The device is powered by rotation of the second shaft to facilitate operation of one or more systems other than the engine.

20 Claims, 5 Drawing Sheets

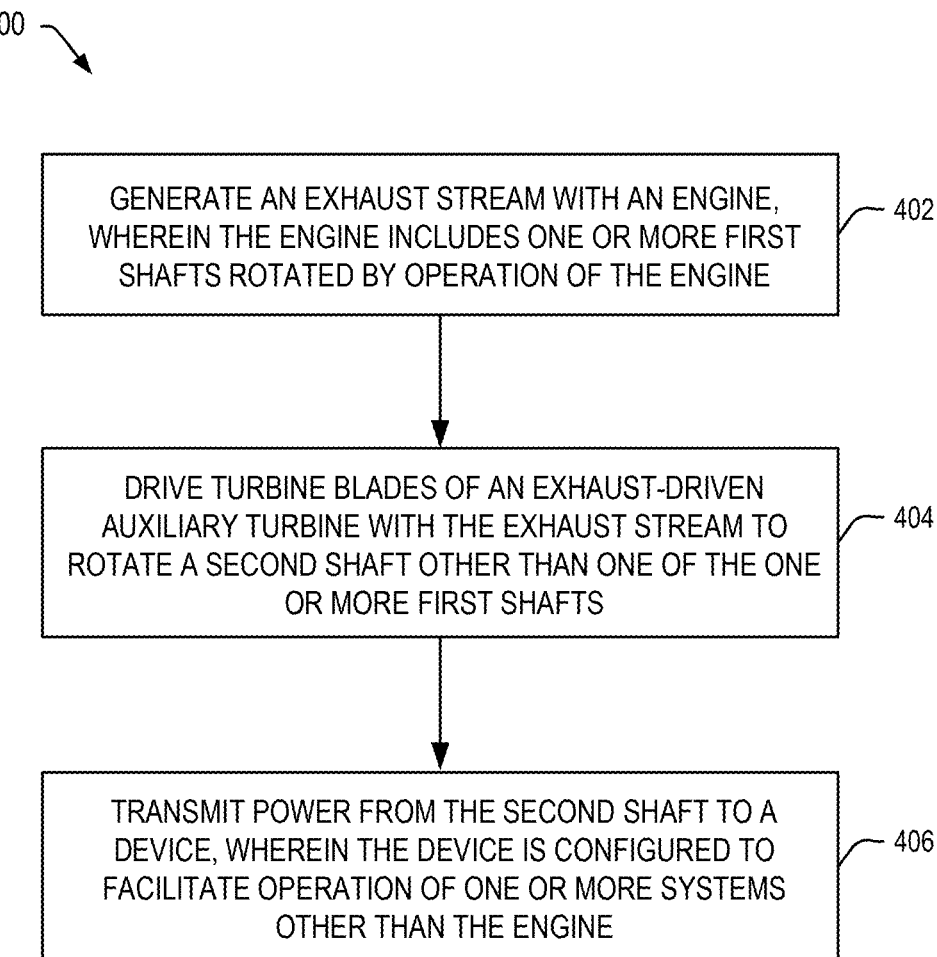

400

GENERATE AN EXHAUST STREAM WITH AN ENGINE, WHEREIN THE ENGINE INCLUDES ONE OR MORE FIRST SHAFTS ROTATED BY OPERATION OF THE ENGINE — 402

DRIVE TURBINE BLADES OF AN EXHAUST-DRIVEN AUXILIARY TURBINE WITH THE EXHAUST STREAM TO ROTATE A SECOND SHAFT OTHER THAN ONE OF THE ONE OR MORE FIRST SHAFTS — 404

TRANSMIT POWER FROM THE SECOND SHAFT TO A DEVICE, WHEREIN THE DEVICE IS CONFIGURED TO FACILITATE OPERATION OF ONE OR MORE SYSTEMS OTHER THAN THE ENGINE — 406

EXHAUST-DRIVEN AUXILIARY TURBINE

STATEMENT OF GOVERNMENT INTEREST

The present disclosure was made with U.S. government support under Contract Numbers HR001120C0119 and HR001123C0012 by the Department of Defense (DoD). The U.S. government has certain rights in the invention.

FIELD OF THE DISCLOSURE

The present disclosure is generally related to an exhaust-driven auxiliary turbine.

BACKGROUND

An engine can be a source of propulsive power for a vehicle (e.g., an aircraft) and a source of power that facilitates operation of the engine. For example, an exhaust stream of a jet engine of an aircraft can provide thrust for the aircraft and can rotate one or more turbine shafts that drive one or more compressors of the engine to facilitate operation of the engine. As another example, an exhaust stream of a piston engine can rotate a shaft of a power turbine that powers a compressor, and compressed air generated by the compressor can be provided to an air intake of the piston engine to facilitate operation of the engine (e.g., the engine includes a turbocharger). In addition, the engine may include one or more offtakes that are sources of secondary power for the vehicle. Returning to the example of the jet engine of an aircraft, the jet engine can include one or more offtakes to provide power for aircraft systems (e.g., starters for other engines, pumps, hydraulic systems, deicing systems, pneumatic systems, etc.). The offtakes may include one or more power offtakes (e.g., gearboxes that rotate one or more secondary shafts from rotation of the one or more turbine shafts), bleed offtakes that extract a portion of compressed air produced by one or more compressors, or both. It is desirable to utilize the exhaust stream of an engine to facilitate operation of another system of the vehicle other than the engine.

SUMMARY

In a particular implementation, a system includes an engine configured to generate an exhaust stream. The engine includes one or more first shafts rotated by operation of the engine. The system includes an exhaust-driven auxiliary turbine positioned to utilize the exhaust stream to cause rotation of a second shaft other than one of the one or more first shafts. The system also includes a device coupled to the second shaft. The device is powered by rotation of the second shaft to facilitate operation of one or more systems other than the engine.

In another particular implementation, a vehicle includes a body. The vehicle includes an engine coupled to the body. The engine is configured to generate an exhaust stream. The engine also includes one or more first shafts rotated by operation of the engine. The vehicle includes an exhaust-driven auxiliary turbine positioned to utilize a portion of the exhaust stream to cause rotation of a second shaft other than one of the one or more first shafts. The vehicle also includes a device coupled to the second shaft. The device is powered by rotation of the second shaft to facilitate operation of one or more systems other than the engine.

In another particular implementation, a method includes generating an exhaust stream with an engine. The engine includes one or more first shafts rotated by operation of the engine. The method includes driving turbine blades of an exhaust-driven auxiliary turbine with the exhaust stream to rotate a second shaft other than one of the one or more first shafts. The method also includes transmitting power from the second shaft to a device. The device is configured to facilitate operation of one or more systems other than the engine.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 4 is a flowchart illustrating an example method of use of an exhaust stream of an engine to rotate a shaft of an exhaust-driven auxiliary turbine to power a device that facilitates operation of one or more systems other than the engine.

DETAILED DESCRIPTION

The figures and the following description illustrate specific exemplary implementations. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature may be presented. Although these features are physically and/or logically distinct, the same reference number may be used for each, or one or more instances may have a distinct reference number.

The present disclosure describes a vehicle that includes an auxiliary power system driven by exhaust gas of an engine of the vehicle. The auxiliary power system includes an exhaust-driven auxiliary turbine and provides output that facilitates operation of one or more systems of the vehicle other than the engine. A technical advantage of the disclosure is that the exhaust stream of the engine is utilized to facilitate operation of one or more systems of the vehicle in addition to, or in lieu of, facilitating operation of the engine. Another technical advantage is that the auxiliary power system does not directly provide air to the engine as does a turbocharger, so operating conditions of the engine do not need to be adjusted to accommodate use of the auxiliary power system. Another technical advantage of the disclosure is that the auxiliary power system can facilitate operation of the one or more systems when the engine is idling. Another technical advantage is that the auxiliary power system can provide output when the engine is in operation, whether or not the exhaust stream is used as a primary thrust generator for the vehicle. The term "vehicle" as used herein encompasses land-based vehicles, air-based vehicles, water-based vehicles, and space-based vehicles, including, in all cases, both autonomous vehicles and semi-autonomous vehicles, and both manned or crewed vehicles and unmanned or uncrewed vehicles.

Figure 1:
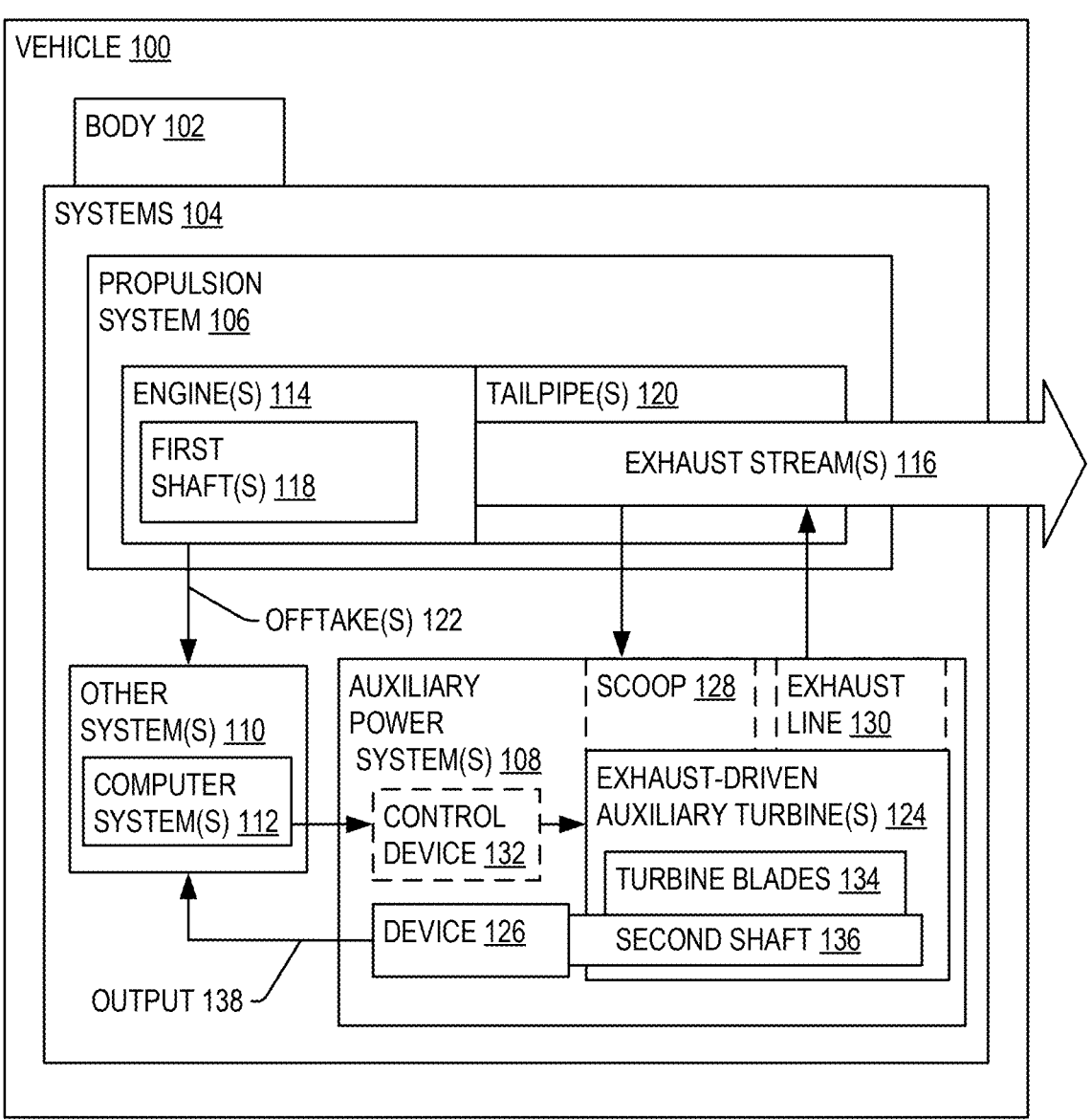
FIG. 1 depicts a block diagram of a vehicle.

FIG. 1 depicts a block diagram of a vehicle 100. The vehicle 100 may be a land-based vehicle (e.g., automobile, motorcycle, truck, construction vehicle, military vehicle etc.), an air-based vehicle (e.g., fixed wing aircraft, vertical takeoff and landing aircraft, helicopter, rotorcraft, drone, etc.), a water-based vehicle (e.g., a boat, ship, submarine, etc.), a space-based vehicle (e.g., spaceship, rocket, orbiter, sub-orbiter, rover, etc.) or a combination thereof. The vehicle 100 includes a body 102 and systems 104. The systems 104 include a propulsion system 106 configured to move the body 102, one or more auxiliary power systems 108, and one or more other systems 110. The other system(s) 110 depend on the type of vehicle 100 and may include one or more computer systems 112 to facilitate operation and control of the vehicle 100, an electrical system, a pneumatic system, a hydraulic system, a deicing system, an engine startup system, an environmental control system for one or more compartments of the body 102, additional systems, or combinations thereof.

The propulsion system 106 includes one or more engines 114. In some implementations, an engine 114 is a subsystem (i.e., a system) of the propulsion system 106 and the engine 114 may be any type of engine (e.g., a jet engine, a piston engine, a rotary engine, etc.) that burns fuel to generate an exhaust stream 116 and rotate one or more first shafts 118. A first shaft 118 may be a turbine shaft that drives a compressor, a cam shaft, a drive shaft, etc. In other implementations, a forced convection cooling system or other system associated with one or more other types of engines 114 (e.g., one or more electric motors) may produce the exhaust stream 116 or a portion of the exhaust stream 116. One or more tailpipes 120 receive the exhaust stream(s) 116 from the engine(s) 114 and may pass the exhaust stream(s) 116 to the atmosphere.

In some implementations, one or more of the engines 114 may include one or more offtakes 122. An offtake 122 may be a power offtake or a bleed offtake. A power offtake includes a power offtake shaft configured to be rotated by a particular first shaft 118. Rotation of the power offtake shaft may power a device (e.g., a generator). Some engines 114 do not include power offtakes. A bleed offtake diverts a portion of compressed air from the engine 114 at a location in the engine 114 before combustion of fuel in the engine 114. The compressed air may be used by one or more of the other system(s) 110 (e.g., by a deicing system of an aircraft to provide air to prevent ice buildup on portions of wings, inlets to the engine(s) 114, or both). Some engines 114 do not include bleed offtakes.

The vehicle 100 may include an auxiliary power system 108 for each engine 114 or for one or more selected engines of the engine(s) 114. The auxiliary power system 108 for an engine 114 includes an exhaust-driven auxiliary turbine 124 and a device 126; and optionally includes a scoop 128, an exhaust line 130, and a control device 132. In some implementations, the exhaust-driven auxiliary turbine 124 is positioned in the tailpipe 120 of the engine 114 and in other implementations, the exhaust-driven auxiliary turbine 124 is outside of the tailpipe 120. In some implementations, the auxiliary power system 108 includes one or more additional components or configurations. For example, when the device 126 is a compressor used to generate compressed air for one or more of the other systems 110, excess compressed air generated by the device 126 may be directed to the exhaust stream 116 in one of the tailpipes 120.

The exhaust-driven auxiliary turbine 124 for the engine 114 includes turbine blades 134 coupled to a second shaft 136. The turbine blades 134 are rotated by the exhaust stream 116 of the engine 114. Rotation of the turbine blades 134 causes rotation of the second shaft 136. Rotation of the second shaft 136 powers the device 126, and output 138 of the device is provided to one or more of the other systems 110. The device 126 may be a generator, compressor, pump, or other device powered by rotation of the second shaft 136. When the device 126 is a generator, electricity produced by the generator may supplement or replace electricity produced by a second generator powered by a power takeoff of the engine 114 when the engine 114 includes a power takeoff that runs the second generator. The device 126 is configured to facilitate operation of one or more of the other systems 110 other than the engine 114 that produces the exhaust stream 116 that causes rotation of the second shaft 136 of the exhaust-driven auxiliary turbine 124. In some implementations, the device 126 facilitates operation of the engine 114, and the device 126 also facilitates operation of one or more of the other systems 110. For example, when the vehicle 100 is an aircraft, the device 126 may be a generator that provides electricity to an electrical system (i.e., one of the other systems 110), and the electrical system provides electricity to the computer system 112. The computer system 112 facilitates operation of the engines 114 by controlling the engines (e.g., controlling fuel flow to the engines 114 based on positions of throttle levers of the engines 114 and sensor data from a sensor system of the aircraft). The electrical system also provides electricity to power a passenger entertainment system (i.e., another system of the other systems 110) associated with a passenger cabin of the aircraft. In addition to facilitating operation of the engines 114 by powering the electrical system, the device 126 facilitates operation of a particular system of the other systems 110 (i.e., the passenger entertainment system) that does not facilitate operation of the engines 114.

When the exhaust-driven auxiliary turbine 124 is positioned in the tailpipe 120, the exhaust-driven auxiliary turbine 124 may include a gearbox that couples a primary shaft of the exhaust-driven auxiliary turbine 124 to the second shaft 136. Rotation of the turbine blades 134 causes rotation of the primary shaft, which causes rotation of the second shaft 136. When the exhaust-driven auxiliary turbine 124 is positioned outside of the tailpipe 120, the turbine blades 134 may be coupled to the second shaft 136 so that rotation of the turbine blades 134 by the exhaust stream 116 from the scoop 128 causes rotation of the second shaft 136.

When the exhaust-driven auxiliary turbine 124 is outside of the tailpipe 120, the scoop 128 directs all, or a portion, of the exhaust stream 116 from the engine 114 to the exhaust-driven auxiliary turbine 124, and the exhaust line 130 directs the exhaust stream 116 back to the tailpipe 120. For engines 114 that produce thrust due to the exhaust stream 116, providing the exhaust stream 116 back to the tailpipe 120 allows the exhaust stream 116 that drives the exhaust-driven auxiliary turbine 124 to generate thrust when energy associated with the exhaust stream 116 that drives the exhaust-driven auxiliary turbine 124 (e.g., kinetic energy due to velocity of the exhaust stream 116 provided by the exhaust line 130 to the tailpipe 120) is sufficient to generate thrust. In some implementations, the exhaust stream 116 that drives the exhaust-driven auxiliary turbine 124 is provided to the atmosphere instead of the tailpipe 120 (e.g., when the engine 114 is idling and thrust provided by the engine is not utilized, when the kinetic energy of the exhaust stream 116 that drives the exhaust-driven auxiliary turbine 124 is not sufficient to generate thrust if introduced into the tailpipe 120, etc.).

In some implementations, the auxiliary power system 108 for the engine 114 includes the control device 132. The control device 132 controls operation of the exhaust-driven auxiliary turbine 124 based on control signals received from the computer system(s) 112. The control device 132 may restrict or inhibit operation of the exhaust-driven auxiliary turbine 124 based on one or more operating conditions of the vehicle 100. For example, when the vehicle 100 is an aircraft, operation of the exhaust-driven auxiliary turbine 124 may be restricted or inhibited during startup of the engine 114, during takeoff of the aircraft, or based on other conditions. In implementations where the exhaust-driven auxiliary turbine 124 is outside of the tailpipe 120, the control device 132 can be configured to adjust the exhaust stream 116 flow through the scoop 128 by moving a restrictor in the scoop 128 to allow more of the exhaust stream 116, or less of the exhaust stream 116, to pass to the exhaust-driven auxiliary turbine 124. In implementations where the exhaust-driven auxiliary turbine 124 is positioned in the tailpipe 120, the control device 132 may control a brake system that controls rotation of one or more shafts of the exhaust-driven auxiliary turbine 124.

In FIG. 1, a component is associated with a particular system for convenience and the component may be considered associated with the particular system, associated with one or more other systems, or both. For example, when the device 126 is a generator powered by a particular engine 114, the device 126 may be considered to be part of the auxiliary power system 108, may be considered to be part of an electrical system that receives electricity generated by the device 126, or both. As another example, the computer system(s) 112 may include particular units dedicated to operating the propulsion system 106, and such units are considered part of the propulsion system 106, part of the computer system 112, or both.

Figure 2:
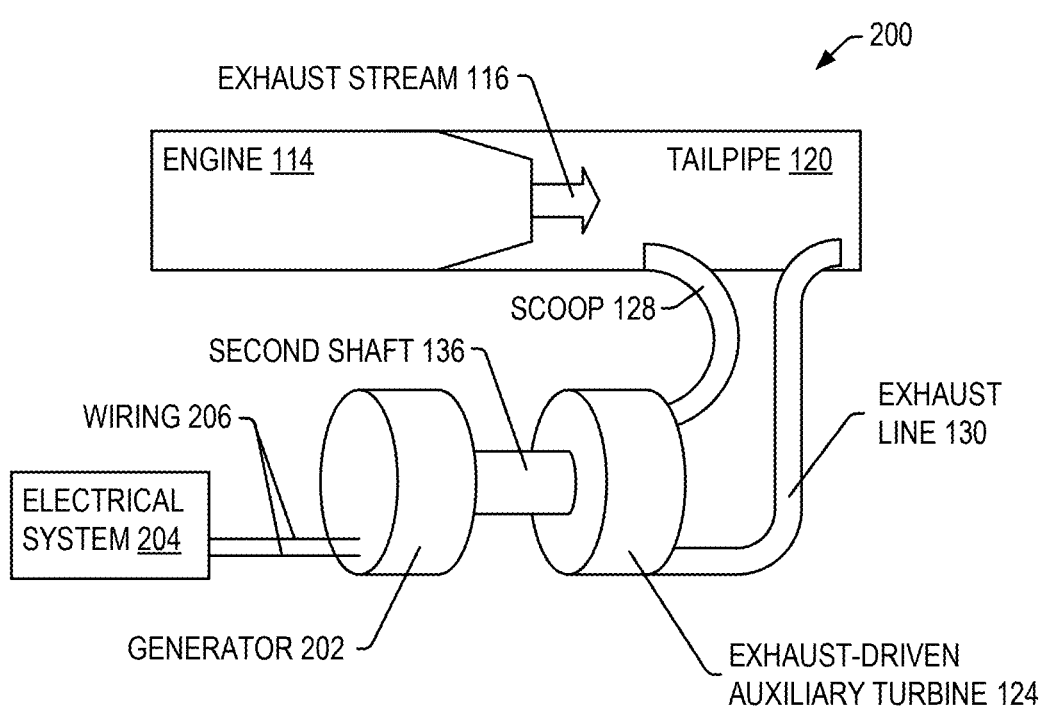
FIG. 2 depicts a block diagram of a system with a generator powered by a second shaft of an exhaust-driven auxiliary turbine.

FIG. 2 depicts a block diagram of a system 200 with a generator 202 powered by a second shaft 136 of an exhaust-driven auxiliary turbine 124. The system 200 includes an engine 114. In some implementations, the engine 114 is part of the propulsion system 106 of FIG. 1 that moves the body 102 of the vehicle 100. In other implementations, the engine 114 is part of the vehicle 100 but is not a component of the propulsion system 106 (i.e., the engine 114 is one of the other systems 110). In other implementations, the engine 114 is not a part of a vehicle.

An exhaust stream 116 generated by the engine 114 passes from the engine 114 to a tailpipe 120. A portion of the exhaust stream 116 is diverted by a scoop 128 to the exhaust-driven auxiliary turbine 124. The portion of the exhaust stream 116 provided to the exhaust-driven auxiliary turbine 124 is returned to the tailpipe 120 via an exhaust line 130.

The portion of the exhaust stream 116 provided to the exhaust-driven auxiliary turbine 124 rotates turbine blades of the exhaust-driven auxiliary turbine 124. Rotation of the turbine blades causes rotation of the second shaft 136 of the exhaust-driven auxiliary turbine 124. The second shaft 136 is coupled to the generator 202. Rotation of the second shaft 136 caused by the portion of the exhaust stream 116 provided by the scoop 128 to the exhaust-driven auxiliary turbine 124 causes the generator 202 to produce electricity. The electricity is provided to an electrical system 204 (e.g., one of the other systems 110 of FIG. 1) by wiring 206. The electrical system 204 may convert the electricity received from the generator 202 to electricity having particular characteristics (e.g., voltage, amperage, phase, etc.). The electrical system 204 is configured to provide electricity having the particular characteristics to one or more devices of the system 200 (e.g., one or more particular devices of the other systems 110) or one or more devices external to the system 200.

Figure 3:
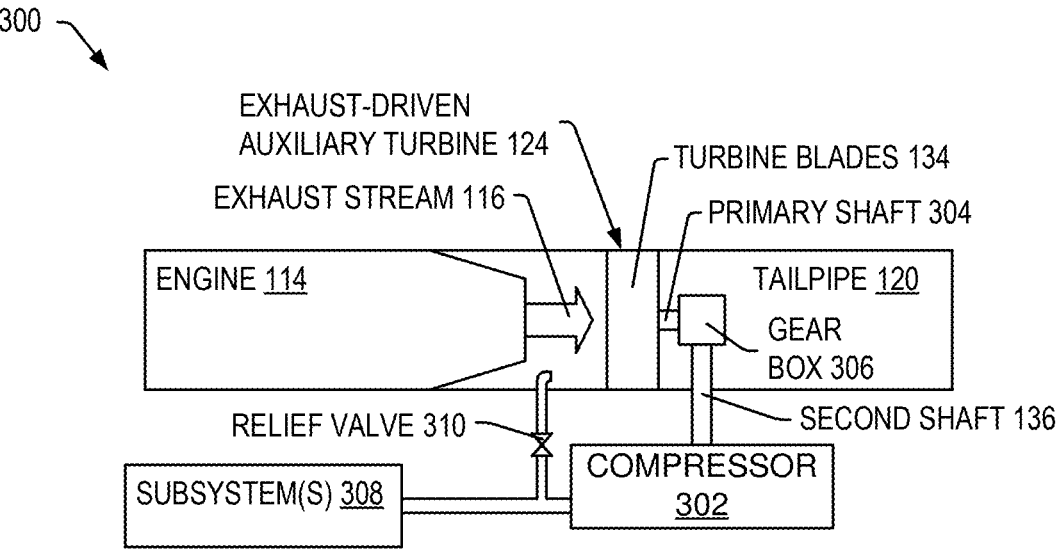
FIG. 3 depicts a block diagram of a system with a compressor powered by a second shaft of an exhaust-driven auxiliary turbine.

FIG. 3 depicts a block diagram of a system 300 with a compressor 302 powered by a second shaft 136 of an exhaust-driven auxiliary turbine 124. The system 300 includes an engine 114. The engine 114 may be part of the propulsion system 106 of FIG. 1 that moves the body 102 of the vehicle 100. In other implementations, the engine 114 is part of the vehicle 100 but is not a component of the propulsion system 106 (i.e., the engine 114 is one of the other systems 110). In other implementations, the engine 114 is not a part of a vehicle.

An exhaust stream 116 generated by the engine 114 passes from the engine 114 to a tailpipe 120. The exhaust-driven auxiliary turbine 124 is positioned in the tailpipe. The exhaust-driven auxiliary turbine 124 includes turbine blades 134, a primary shaft 304, a gearbox 306, and a second shaft 136. The exhaust stream 116 from the engine 114 rotates the turbine blades 134. Rotation of the turbine blades 134 causes rotation of the primary shaft 304. The gearbox 306 is configured to rotate the second shaft 136 based on the rotation of the primary shaft 304.

Rotation of the second shaft 136 powers the compressor 302. The compressor 302 generates compressed air that is provided to one or more subsystems 308 (e.g., one or more of the other systems 110 of FIG. 1) of the system 300 that utilize compressed air. In some implementations (e.g., implementations where the exhaust stream 116 produced by the engine 114 generates thrust), excess compressed air produced by the compressor 302 is introduced into the exhaust stream 116 by passing through a relief valve 310 to the tailpipe 120 of the engine 114 or to the tailpipe of another engine of the system 300. Introducing the excess compressed air into the exhaust stream 116 in the tailpipe 120 enables a portion of excess shaft work generated by the second shaft 136 to be converted back to thrust.

FIG. 4 is a flowchart illustrating an example method 400 of use of an exhaust stream of an engine to rotate a shaft of an exhaust-driven auxiliary turbine to power a device that facilitates operation of one or more systems other than the engine. The method 400 may be performed by the vehicle 100 of FIG. 1 or the systems 200, 300 of FIG. 2 and FIG. 3. The method 400, at block 402, includes generating an exhaust stream with an engine, where the engine includes one or more first shafts rotated by operation of the engine. For example, the vehicle 100 of FIG. 1 includes the engine(s) 114 and operation of the engine(s) rotates the first shaft(s) 118 and generates exhaust stream 116.

The method 400, at block 404, includes driving turbine blades of an exhaust-driven auxiliary turbine with the exhaust stream to rotate a second shaft other than one of the one or more first shafts. For example, an exhaust stream 116 of FIG. 1 is provided to the turbine blades 134 of the exhaust-driven auxiliary turbine 124 to rotate the second shaft 136, which is distinct from the first shaft(s) 118 of the engine 114. In some implementations, the exhaust-driven auxiliary turbine 124 is positioned outside of the tailpipe 120 of engine 114 (e.g., as depicted in FIG. 2). In such implementations, the scoop 128 directs all, or a portion, of the exhaust stream 116 from the tailpipe 120 to the exhaust-driven auxiliary turbine 124, and the exhaust line 130 may direct the exhaust stream from the exhaust-driven auxiliary turbine 124 back to the tailpipe 120. In some implementations, the exhaust-driven auxiliary turbine is positioned in the tailpipe 120 of the engine 114 (e.g., as depicted in FIG. 3).

The method 400, at block 406, also includes transmitting power from the second shaft to a device, where the device is configured to facilitate operation of one or more systems other than the engine. For example, the second shaft 136 of FIG. 1 transmits rotational energy to the device 126 to power the device 126 and output of the device 126 is provided to one or more of the other system(s) 110 to facilitate operation of one or more of the other system(s) 110. In some implementations, the device 126 is a compressor 302 and excess compressed air generated by the compressor 302 may be introduced into the exhaust stream 116 produced by the engine 114 to convert some excess work of the second shaft 136 to thrust when the exhaust stream 116 of the engine 114 is a primary thrust generator.

Figure 5:
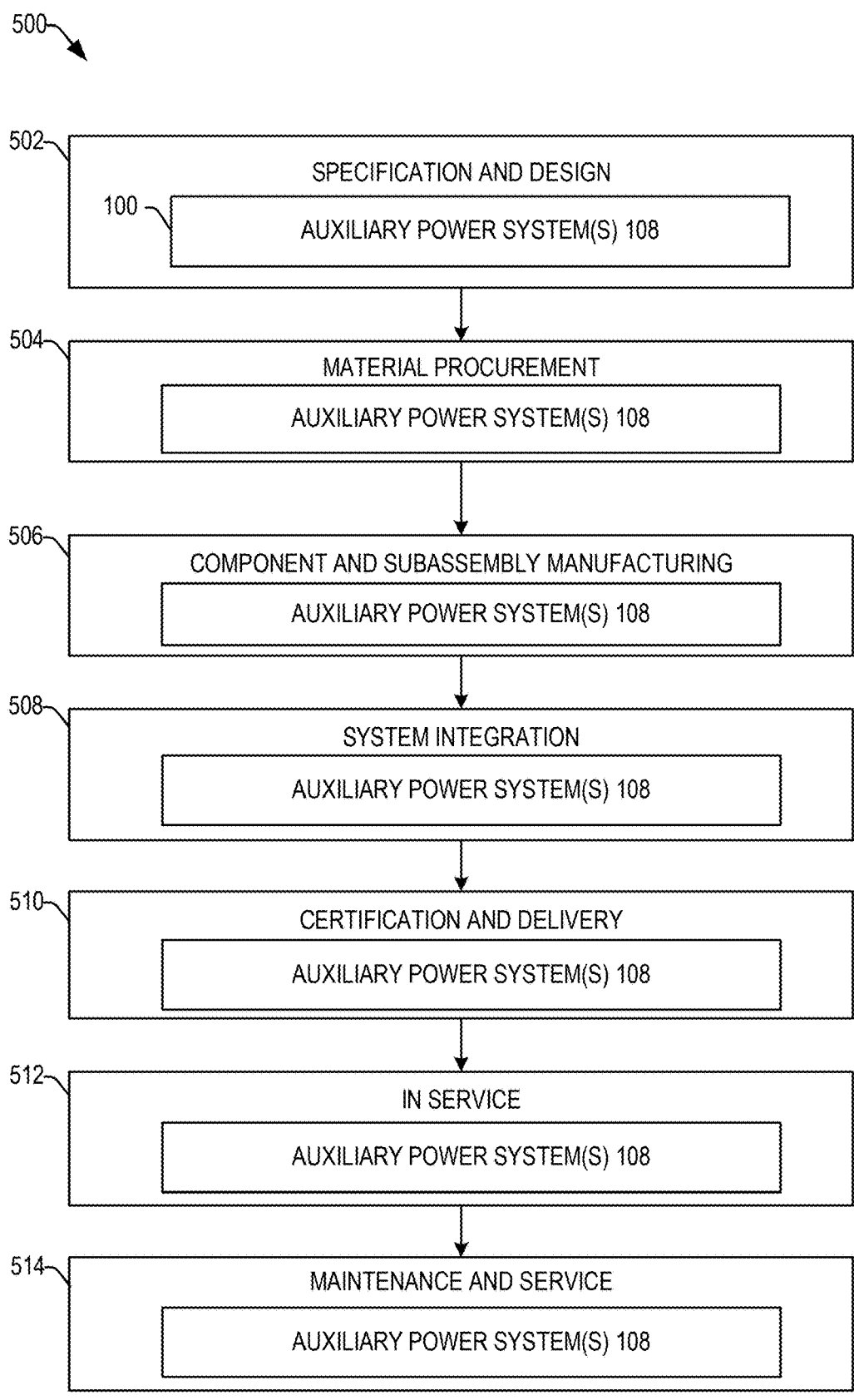
FIG. 5 is a flowchart illustrating an example of a life cycle of an aircraft including the auxiliary power system of FIG. 1.

Referring to FIG. 5, a flowchart illustrative of an example of a life cycle of the vehicle 100 that includes the auxiliary power system(s) 108 is shown and designated as method 500. In some implementations, the vehicle 100 of FIG. 1 is an aircraft. During pre-production, the method 500 includes, at block 502, specification and design of the vehicle 100, including the portions of the vehicle 100 described above. During specification and design of the vehicle 100, the method 500 can include specification and design of the auxiliary power system(s) 108. At block 504, the method 500 includes material procurement, which can include procuring materials for the auxiliary power system(s) 108.

During production, the method 500 includes, at block 506, component and subassembly manufacturing and, at block 508, system integration of the vehicle 100. For example, the method 500 can include component and subassembly manufacturing of the auxiliary power system(s) 108 and system integration of the auxiliary power system(s) 108. At block 510, the method 500 includes certification and delivery of the vehicle 100 and, at block 512, placing the vehicle 100 in service. Certification and delivery can include certification of the auxiliary power system(s) 108 to place the auxiliary power system(s) 108 in service. While in service by a customer, the vehicle 100 can be scheduled for routine maintenance and service (which can also include modification, reconfiguration, refurbishment, and so on). At block 514, the method 500 includes performing maintenance and service on the vehicle 100, which can include performing maintenance and service on the auxiliary power system(s) 108. Alternatively, performing maintenance and service on the vehicle 100 can include adding an auxiliary power system(s) 108 of the present disclosure during a retrofit operation.

Each of the processes of the method 500 can be performed or carried out by a system integrator, a third party, and/or an operator (e.g., a customer). For the purposes of this description, a system integrator can include without limitation any number of manufacturers (e.g., aircraft manufacturers) and/or major-system subcontractors; a third party can include without limitation any number of vendors, subcontractors, and/or suppliers; and an operator can be a service provider (e.g., airline), leasing company, military entity, service organization, and so on.

Figure 6:
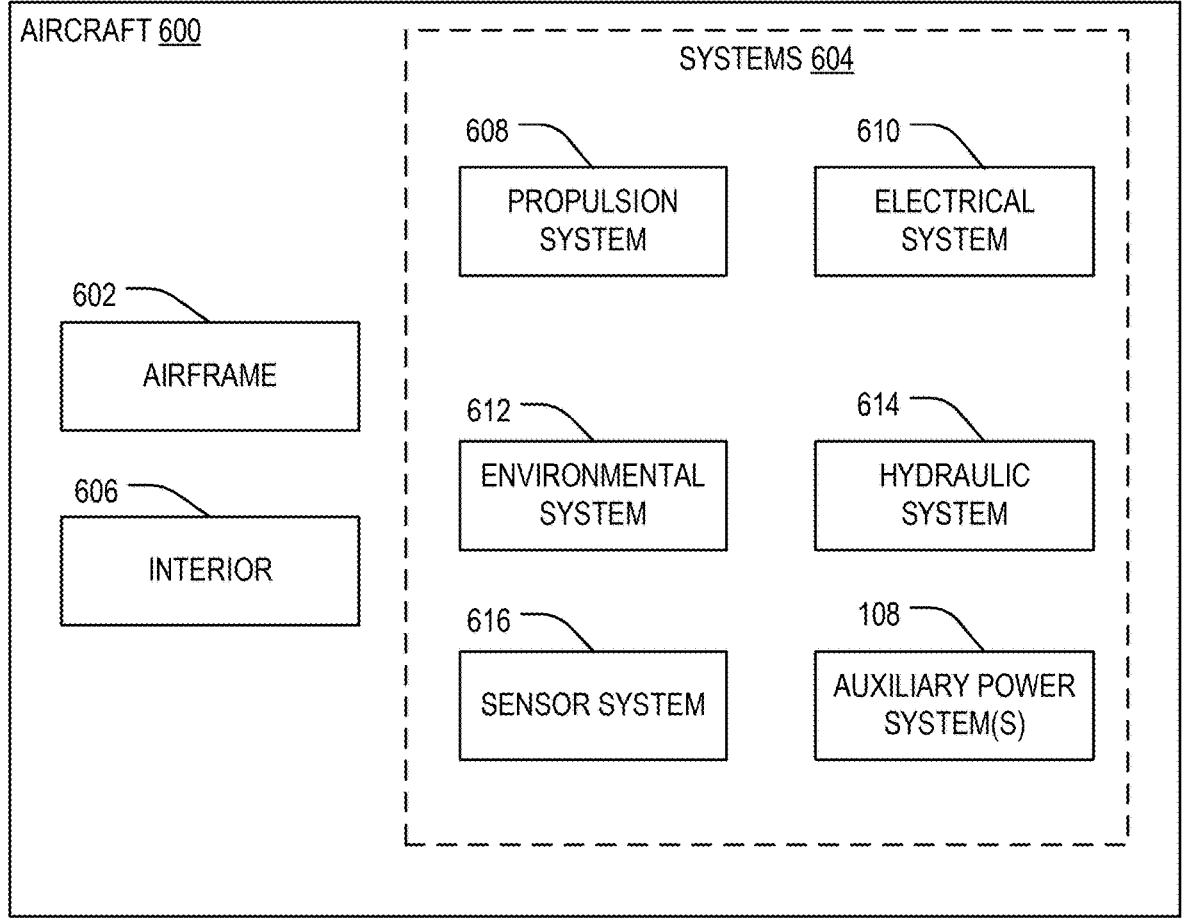
FIG. 6 is a block diagram of a particular implementation of the aircraft associated with the life cycle of FIG. 5.

Aspects of the disclosure can be described in the context of an example of a vehicle (e.g., the vehicle 100 of FIG. 1). A particular example of the vehicle is an aircraft 600 as shown in FIG. 6. In the example of FIG. 6, the aircraft 600 includes an airframe 602 with a plurality of systems 604 and an interior 606. Examples of the plurality of systems 604 include one or more of a propulsion system 608, an electrical system 610, an environmental system 612, a hydraulic system 614, a sensor system 616, and the auxiliary power system(s) 108. Any number of other systems can also be included. In the example of FIG. 6, the auxiliary power system(s) 108 corresponds to the auxiliary power system(s) 108 of FIG. 1 and the auxiliary power system(s) 108 included in the aircraft associated with the method 500 of FIG. 5.

Particular aspects of the disclosure are described below in sets of interrelated Examples:

According to Example 1, a system includes an engine configured to generate an exhaust stream, wherein the engine comprises one or more first shafts rotated by operation of the engine; an exhaust-driven auxiliary turbine positioned to utilize the exhaust stream to cause rotation of a second shaft other than one of the one or more first shafts; and a device coupled to the second shaft, wherein the device is powered by rotation of the second shaft to facilitate operation of one or more systems other than the engine.

Example 2 includes the system of Example 1, wherein the device comprises a compressor.

Example 3 includes the system of Example 2, wherein excess compressed air provided by the compressor is supplied to the exhaust stream.

Example 4 includes the system of any of Examples 1 to 3, wherein the device comprises a generator.

Example 5 includes the system of any of Examples 1 to 4, wherein the engine comprises a jet engine.

Example 6 includes the system of any of Examples 1 to 5 and further includes a tailpipe that receives the exhaust stream from the engine.

Example 7 includes the system of Example 6, wherein turbine blades of the exhaust-driven auxiliary turbine are positioned in the tailpipe.

Example 8 includes the system of Example 6, wherein a scoop directs a portion of the exhaust stream to turbine blades of the exhaust-driven auxiliary turbine.

Example 9 includes the system of Example 8, wherein an exhaust line directs the portion of the exhaust stream from the exhaust-driven auxiliary turbine to the tailpipe.

Example 10 includes the system of any of Examples 1-9 and further includes a controller to control operation of the exhaust-driven auxiliary turbine.

According to Example 11, a vehicle includes a body; an engine coupled to the body, wherein the engine is configured to generate an exhaust stream, and wherein the engine comprises one or more first shafts rotated by operation of the engine; an exhaust-driven auxiliary turbine positioned to utilize a portion of the exhaust stream to cause rotation of a second shaft other than one of the one or more first shafts; and a device coupled to the second shaft, wherein the device is powered by rotation of the second shaft to facilitate operation of one or more systems other than the engine.

Example 12 includes the vehicle of Example 11, wherein the engine is a portion of a propulsion system configured to move the body.

Example 13 includes the vehicle of Example 11 or Example 12 and further includes a tailpipe, wherein turbine blades of the exhaust-driven auxiliary turbine are positioned in the tailpipe.

Example 14 includes the vehicle of Example 11 or Example 12 and further includes a tailpipe, wherein a scoop directs a portion of the exhaust stream to turbine blades of the exhaust-driven auxiliary turbine.

Example 15 includes the vehicle of any of Example 14, wherein an exhaust line directs the portion of the exhaust stream from the exhaust-driven auxiliary turbine to the tailpipe.

Example 16 includes the vehicle of any of Examples 11-15, wherein the vehicle is an aircraft.

According to Example 17, a method includes generating an exhaust stream with an engine, wherein the engine includes one or more first shafts rotated by operation of the engine; driving turbine blades of an exhaust-driven auxiliary turbine with the exhaust stream to rotate a second shaft other than one of the one or more first shafts; and transmitting power from the second shaft to a device, wherein the device is configured to facilitate operation of one or more systems other than the engine.

Example 18 includes the method of Example 17 and further includes directing a portion of the exhaust stream from a tailpipe through a scoop to the turbine blades of the exhaust-driven auxiliary turbine.

Example 19 includes the method of Example 17 or Example 18 and further includes directing the portion of the exhaust stream from the exhaust-driven auxiliary turbine to the tailpipe.

Example 20 includes the method of any of Examples 17 to 19, wherein the device comprises a compressor, and further comprising introducing excess compressed air produced by the compressor into the exhaust stream.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a vehicle 100 including one or more engines 114, which indicates that in some implementations the vehicle 100 includes a single engine (e.g., the vehicle 100 is a car that includes a single engine); and in other implementations, the vehicle 100 includes multiple engines 114 (e.g., the vehicle is an airplane that includes multiple engines 114). For ease of reference herein, such features are generally introduced as "one or more" features and are subsequently referred to in the singular unless aspects related to multiple of the features are being specifically described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements. As used herein, A "and/or" B may mean that either "A and B", or "A or B", or both "A and B" and "A or B" are applicable or acceptable.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system comprising:
an engine configured to generate an exhaust stream, wherein the engine comprises one or more first shafts rotated by operation of the engine;
a tailpipe to receive the exhaust stream from the engine, wherein the exhaust stream comprises post-combustion gases generated during operation of the engine;
a scoop coupled to and protruding through the tailpipe to a position along an internal wall of the tailpipe and at a radial height inside the tailpipe;
an exhaust-driven auxiliary turbine including a second shaft other than one of the one or more first shafts and positioned to receive a diverted portion of the exhaust stream from the tailpipe via the scoop, wherein the diverted portion of the exhaust stream causes rotation of the second shaft, wherein the post-combustion gases rotate turbine blades coupled to the second shaft, and wherein the exhaust-driven auxiliary turbine is positioned outside the tailpipe;
an exhaust line protruding through the tailpipe downstream of the scoop, an outlet of the exhaust line positioned at the internal wall of the tailpipe at the radial height inside the tailpipe and axially aligned with the scoop, the exhaust line configured to return the diverted portion of the exhaust stream from the exhaust-driven auxiliary turbine to the tailpipe; and
a device coupled to the second shaft, wherein the device is powered by rotation of the second shaft.

2. The system of claim 1, wherein the device comprises a compressor.

3. The system of claim 2, wherein excess compressed air provided by the compressor is introduced into the exhaust stream in the tailpipe.

4. The system of claim 1, wherein the device comprises a generator.

5. The system of claim 1, wherein the engine comprises a jet engine.

6. The system of claim 1, further comprising an aircraft coupled to the engine.

7. The system of claim 1, wherein rotation of the second shaft provides mechanical power to the device.

8. The system of claim 1, further comprising a control device to control operation of the exhaust-driven auxiliary turbine.

9. The system of claim 8, wherein the control device inhibits operation of the exhaust-driven auxiliary turbine during startup of the engine.

10. The system of claim 8, wherein the control device controls operation of the exhaust-driven auxiliary turbine by adjusting flow through the scoop.

11. A vehicle comprising:
a body;
an engine coupled to the body, wherein the engine is configured to generate an exhaust stream, and wherein the engine comprises one or more first shafts rotated by operation of the engine;
a tailpipe configured to receive the exhaust stream from the engine, wherein the exhaust stream comprises post-combustion gases generated during operation of the engine;

a scoop coupled to and protruding through the tailpipe to a position along an internal wall of the tailpipe and at a radial height inside the tailpipe;
an exhaust-driven auxiliary turbine including a second shaft other than one of the one or more first shafts and positioned to receive a diverted portion of the exhaust stream from the tailpipe via the scoop, wherein the diverted portion of the exhaust stream causes rotation of the second shaft, wherein the post-combustion gases rotate turbine blades coupled to the second shaft, and wherein the exhaust-driven auxiliary turbine is positioned outside the tailpipe;
an exhaust line protruding through the tailpipe downstream of the scoop, an outlet of the exhaust line positioned at the internal wall of the tailpipe at the radial height inside the tailpipe and axially aligned with the scoop, the exhaust line configured to return the diverted portion of the exhaust stream from the auxiliary turbine back to the tailpipe; and
a device coupled to the second shaft, wherein the device is powered by rotation of the second shaft.

12. The vehicle of claim 11, wherein the engine is a portion of a propulsion system configured to move the body.

13. The vehicle of claim 11, wherein rotation of the second shaft provides mechanical power to the device.

14. The vehicle of claim 11, wherein the device comprises a compressor that generates compressed air provided to one or more subsystems, and wherein excess compressed air produced by the compressor is introduced into the exhaust stream in the tailpipe by passing through a relief valve.

15. The vehicle of claim 14, further comprising a control device to control operation of the exhaust-driven auxiliary turbine.

16. The vehicle of claim 11, wherein the vehicle is an aircraft.

17. A method comprising:
generating an exhaust stream with an engine, wherein the engine includes one or more first shafts rotated by operation of the engine;
passing the exhaust stream into a tailpipe, wherein the exhaust stream comprises post-combustion gases generated during operation of the engine;
coupling a scoop to the tailpipe such that the scoop protrudes through the tailpipe to a position along an internal wall of the tailpipe and at a radial height inside the tailpipe;
directing a diverted portion of the exhaust stream from the tailpipe via the scoop;
utilizing the diverted portion of the exhaust stream from the scoop to drive turbine blades of an exhaust-driven auxiliary turbine to rotate a second shaft other than one of the one or more first shafts, wherein the post-combustion gases rotate the turbine blades coupled to the second shaft, and wherein the exhaust-driven auxiliary turbine is positioned outside of the tailpipe;
returning the diverted portion of the exhaust stream from the exhaust-driven auxiliary turbine to the tailpipe via an exhaust line, wherein the exhaust line protrudes through the tailpipe downstream of the scoop, and wherein an outlet of the exhaust line is positioned at the internal wall of the tailpipe at the radial height inside the tailpipe and axially aligned with the scoop; and
transmitting power from the second shaft to a device.

18. The method of claim 17, further comprising inhibiting operation of the exhaust-driven auxiliary turbine via a control system during startup of the engine.

19. The method of claim 18, wherein the control system controls operation of the exhaust-driven auxiliary turbine by adjusting exhaust stream flow through the scoop.

20. The method of claim 17, wherein the device comprises a compressor, and further comprising introducing excess compressed air produced by the compressor into the exhaust stream.

\* \* \* \* \*